Patented Nov. 10, 1925.

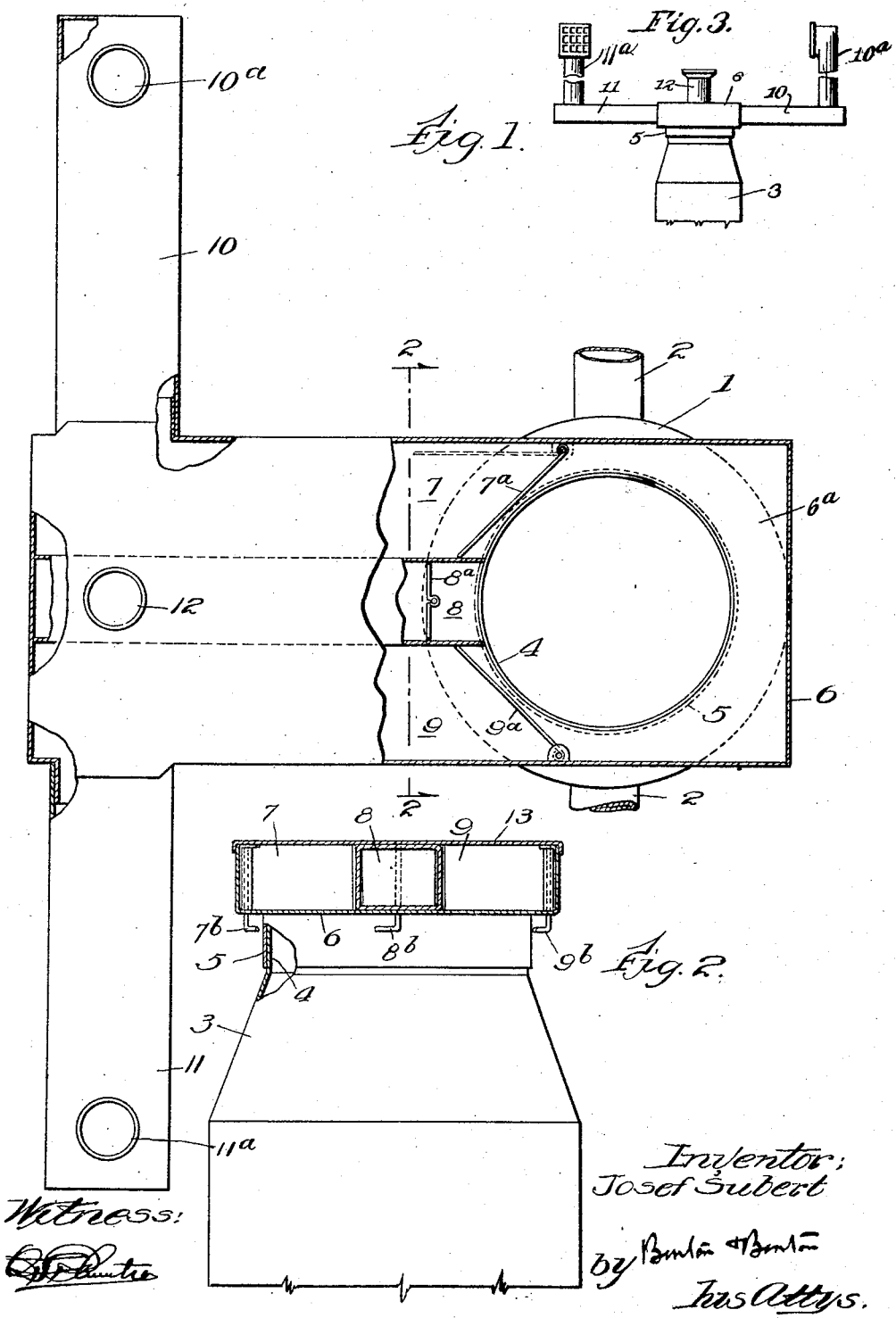

1,560,875

UNITED STATES PATENT OFFICE.

JOSEF SUBERT, OF OAK PARK, ILLINOIS.

PIPING SYSTEM FOR HOT-AIR FURNACES.

Application filed March 11, 1921. Serial No. 451,493.

*To all whom it may concern:*

Be it known that I, JOSEF SUBERT, a citizen of the United States, residing at Oak Park, in the county of Cook and the State of Illinois, have invented certain new and useful Improvements in Piping Systems for Hot-Air Furnaces, of which the following is a specification, reference being had to the accompanying drawing, forming a part thereof.

The purpose of this invention is to provide a piping system for hot air heating plants which shall be more compact in arrangement, easier to install, and more efficient in operation than the systems now in use. It consists of certain features of construction and combinations of parts hereinafter described and shown in the drawings as indicated by the claims.

In the drawing:—

Figure 1 is a top plan view partly in section showing a piping system embodying this invention.

Figure 2 is a transverse section taken as indicated at line 2—2 on Figure 1 and showing also a part of a furnace with a fragment of its wall broken away for illustrating in section a certain detail of the construction.

Figure 3 is a diagrammatic elevation of the piping system including the vertical hot air conduits and their outlets.

In nearly every hot air heating system which has been installed in a residence building experience shows that some of the rooms of the building are generally harder to heat than others and that some of the rooms when exposed to particularly severe winds become so chilled that it is almost impossible to force a flow of hot air to them from the furnace. In such systems the pipes ordinarily radiate from the furnace in various directions, each pipe or conduit extending as a separate unit from the furnace to the hot air outlet in the room which it serves. When a given room is particularly cold the cold air tends to enter the opening from the furnace pipe and to fill the pipe itself so that heat can only be transmitted to the room after this long column of cold air has become heated by conduction from one end to the other.

My invention provides for arranging two or more pipes or conduits in contiguous relation to each other and in applying this arrangement to any given building I plan to use one of the contiguous conduits for conducting air to a room which is relatively easy to heat so that a ready flow of the warm air through this conduit will always be assured. The adjacent conduit is then utilized for conducting air to the room or space which is more difficult to heat but the wall of this conduit being constantly in contact with a column of warm air will itself receive enough heat therefrom to facilitate the flow of air in the conduit itself so that a circulation of heated air therethrough can be set up promptly upon opening the grille or register leading to the space to be heated.

Referring to the drawing the furnace itself is illustrated rather diagrammatically at 1, and cold air intake pipes are shown at 2 leading to the lower portion of the air heating chamber, 3, of the furnace. The upper portion of the chamber, 3, preferably terminates in a cylindrical collar or flange, 4, over which a flange, 5, is slidably fitted. The flange, 5, extends downward from the margin of a circular opening in the bottom of the intake chamber $6^a$, of a rectangular boxlike structure or trunk, 6, in which, as illustrated there are three ducts or conduits, 7, 8 and 9. These are provided with valves or shutters, $7^a$, $8^a$, and $9^a$, respectively for regulating the flow of warm air through them and suitable handles, $7^b$, $8^b$, $9^b$, are shown in Figure 2 extending from the under side of the box, 6, for this purpose. The conduits, 7 and 9 as shown connect with branch pipes, 10 and 11 respectively which may be understood as leading through vertical connections at $10^a$ and $11^a$ as shown in Figure 3, to rooms which are not particularly difficult to heat. The middle conduit, 8, is preferably constructed as a separate pipe of rectangular cross-section as shown in Figure 2 and may be understood as leading to a space which is normally difficult to heat, such as a room at the exposed corner of the building or a hall space adjacent an outer door. The final connection with such space is made through any suitable pipe attached to the flanged outlet, 12, as indicated in Figure 3.

The flow of warm air through conduits, 7 and 9, or either of them, warms the side walls of the conduit, 8, by direct contact therewith so that when the valve, $8^a$, is opened the air within the conduit, 8, will be already somewhat heated and will not oppose the outflow of warm air from the chamber, 3. If one of the conduits, 7 or 9, should be temporarily out of use the other one will nevertheless furnish sufficient heat to warm the air in the conduit, 8, as described.

Another advantage of the construction illustrated is that by assembling the conduits in the relatively flat box-like structure, 6, they provide for more head room in the basement of the building in which the heating plant is located and are confined to a more restricted area so as to leave large areas of the basement ceiling entirely unobstructed by such piping. Furthermore, by reason of the increased efficiency secured with my piping, it is a matter of indifference whether the furnace be located centrally in the building or otherwise and it can be placed wherever it will be the least in the way. Then by virtue of the rotatable connection between the trunk, 6, and the air chamber or jacket, 3, such connection being made through the flanges, 4 and 5, it is feasible to make the box, 6, as a standard fixture and upon assembling it with the furnace to swing it in any radial direction so as to extend therefrom through the basement for connecting with the vertical runs of pipe in the building by which air is conducted to the individual rooms or spaces. As shown the box structure, 6, is made with a bottom wall, side walls and end walls in fixed relation but with a flanged cover, 13, which may be readily removed when desired to give access to the conduits, 7 and 8, for cleaning them. With this construction the walls of the pipe or conduit, 8, are completely enclosed by the walls of the trunk, 6, and even the top and bottom walls of said conduit, 8, will receive some heat by conduction from the top and bottom walls of the said trunk.

I claim:—

1. In a heating system a heating source and a plurality of distributing conduits connected for delivery of heated air from the source to separated points of final discharge respectively, said conduits extending in substantially horizontal direction from the heating source parallel and contiguous with each other for a limited distance to permit conduction of heat from one conduit to the next through their walls and branching apart for connection with their respective discharge outlets.

2. In the combination defined in claim 1, the plurality of distributing conduits being compactly associated, having flat contiguous walls.

3. In combination with a hot air furnace, a flat plural trunk leading from the uppermost part of the hot air chamber thereof with longitudinal plane partitions dividing said trunk and separate outlets from the partitioned sections respectively, at points remote from the furnace.

4. In combination with a hot air furnace, a distributing conduit extending in approximately horizontal direction therefrom and a pair of parallel contiguous distributing conduits arranged one at each side of said first mentioned conduit to permit conduction of heat from them through its walls for assisting circulation through the first mentioned conduit.

5. In a hot air heating system, a furnace and a distributing trunk subdivided by a longitudinal vertical partition to form a plurality of contiguous conduits; said trunk surmounting the furnace and being rotatably adjustable thereon for extension in any desired radial direction; and separate delivery outlets extending from the respective conduits of the trunk.

6. The combination with a hot-air furnace, of a hot-air trunk mounted upon and receiving air from the upper portion of the body of the furnace, said trunk including a plurality of conduits which extend substantially horizontally therefrom and being flat in section relatively to its width; said trunk comprising a centrally-disposed air-conduit receiving its air supply from the same source as the remainder of the trunk; branches from the remainder of said trunk, and separate delivery ducts for the several passages thus formed in the trunk.

7. In the combination defined in claim 6, said centrally-disposed air-conduit having walls substantially in contact with the adjacent walls of the trunk.

In testimony whereof, I have hereunto set my hand at Chicago, Illinois this 12th day of February, 1921.

JOSEF SUBERT.